US012366099B2

(12) United States Patent
Jell et al.

(10) Patent No.: US 12,366,099 B2
(45) Date of Patent: Jul. 22, 2025

(54) DOMESTIC APPLIANCE HAVING AN ENERGY TRANSMISSION DEVICE

(71) Applicant: BSH Hausgeräte GmbH, Munich (DE)

(72) Inventors: Peter Jell, Breitbrunn (DE); Alexander Kaltenhauser, Peterskirchen (DE)

(73) Assignee: BSH Hausgeräte GmbH, Munich (DE)

( * ) Notice: Subject to any disclaimer, the term of this patent is extended or adjusted under 35 U.S.C. 154(b) by 928 days.

(21) Appl. No.: 17/441,710

(22) PCT Filed: Apr. 22, 2020

(86) PCT No.: PCT/EP2020/061220

§ 371 (c)(1),
(2) Date: Sep. 22, 2021

(87) PCT Pub. No.: WO2020/224966

PCT Pub. Date: Nov. 12, 2020

(65) Prior Publication Data

US 2022/0195772 A1 Jun. 23, 2022

(30) Foreign Application Priority Data

May 3, 2019 (DE) ..................... 10 2019 206 334.9

(51) Int. Cl.
*E05D 11/00* (2006.01)
*F24C 15/02* (2006.01)
(Continued)

(52) U.S. Cl.
CPC ........ *E05D 11/0081* (2013.01); *F24C 15/023* (2013.01); *F25D 23/028* (2013.01);
(Continued)

(58) Field of Classification Search
CPC .. E05D 11/0081; F24C 15/023; F25D 23/028; F25D 2323/024; H01R 35/00;
(Continued)

(56) References Cited

U.S. PATENT DOCUMENTS 5,960,785 A 10/1999 Blazakis
10,161,169 B2 * 12/2018 Wuerth .................. H02J 50/10
(Continued)

FOREIGN PATENT DOCUMENTS

DE 9012505 U1 6/1991
DE 10319532 A1 11/2004
(Continued)

OTHER PUBLICATIONS

National Search Report DE 10 2019 206 334.9 dated May 3, 2019.
International Search Report PCT/EP2020/061220 dated Jul. 9, 2020.

*Primary Examiner* — Travis S Chambers
(74) *Attorney, Agent, or Firm* — Michael E. Tschupp; Andre Pallapies; Brandon G. Braun

(57) ABSTRACT

A household appliance includes a door pivotable via door hinges and having an electrical load. A treatment chamber has a loading opening which is closeable by the door. An energy transmission device has a primary side including a primary coil which is attached to a stationary part of a respective one of the door hinges, and a secondary side including a secondary coil which is arranged on the door and is electrically connected to the electrical load. The primary coil is capable of being coupled in a manner of a transformer to the secondary coil when the door is closed.

10 Claims, 4 Drawing Sheets

(51) Int. Cl.
*F25D 23/02* (2006.01)
*H01R 35/00* (2006.01)
*H05B 6/64* (2006.01)

(52) U.S. Cl.
CPC ........... *H01R 35/00* (2013.01); *H05B 6/6414* (2013.01); *E05Y 2400/66* (2013.01); *E05Y 2800/00* (2013.01); *E05Y 2900/308* (2013.01); *F25D 2323/024* (2013.01)

(58) Field of Classification Search
CPC ............. E05Y 2400/66; E05Y 2800/00; E05Y 2900/308; E05Y 2900/30
See application file for complete search history.

(56) References Cited

U.S. PATENT DOCUMENTS

| | | | | |
|---|---|---|---|---|
| 2002/0009903 | A1 | 1/2002 | Malnati | |
| 2009/0039068 | A1 | 2/2009 | Boutwell | |
| 2015/0130287 | A1 | 5/2015 | Rost | |
| 2018/0216830 | A1 | 8/2018 | Hildner | |
| 2023/0296260 | A1* | 9/2023 | Bernauer .............. | F24C 15/045 126/19 R |

FOREIGN PATENT DOCUMENTS

| | | | |
|---|---|---|---|
| DE | 102008040435 | A1 | 1/2010 |
| DE | 102013105114 | A1 | 11/2014 |

* cited by examiner

DOMESTIC APPLIANCE HAVING AN ENERGY TRANSMISSION DEVICE

CROSS-REFERENCES TO RELATED APPLICATIONS

This application is the U.S. National Stage of International Application No. PCT/EP2020/061220, filed Apr. 22, 2020, which designated the United States and has been published as International Publication No. WO 2020/224966 A1 and which claims the priority of German Patent Application, Serial No. 10 2019 206 334.9, filed May 3, 2019, pursuant to 35 U.S.C. 119 (a)-(d).

The contents of International Application No. PCT/EP2020/061220 and German Patent Application, Serial No. 10 2019 206 334.9 are incorporated herein by reference in their entireties as if fully set forth herein.

BACKGROUND OF THE INVENTION

The invention relates to a household appliance, having a treatment chamber with a loading opening, which can be closed by means of a door which can be pivoted via door hinges, which door has at least one electrical load, and at least one energy transmission device with a primary side, which has at least one primary coil, and a secondary side, which has at least one secondary coil, wherein the secondary side is arranged on the door and is electrically connected to the at least one load and the primary coil can be coupled in the manner of a transformer to the secondary coil, at least when the door is closed. The invention can be advantageously applied in particular to household cooking appliances such as ovens and/or microwave ovens.

DE 103 19 532 A1 discloses an apparatus for the inductive transmission of energy from a stationary part of a household appliance to a part of the household appliance, mounted movably in relation to the stationary part, with a primary winding arranged in the stationary part and a secondary winding arranged in the movable part, wherein the primary winding surrounds a primary core and the secondary winding surrounds a secondary core. The movably mounted part can be a door.

DE 10 2013 105 114 A1 discloses a cooking appliance, which has a housing, on which a system for supplying energy is provided, wherein the energy supply system has at least one electrical coil, which is provided to interact without contact with a second electrical coil which is assigned to a load.

DE 90 12 505 U1 discloses an electronic door closing apparatus with a wireless energy transmission facility to supply an energy storage unit on a door leaf side from a frame-side mains connection, having a facility for inductive transmission of energy to the energy storage unit by means of a magnetic circuit composed of a partial magnetic circuit arranged in each case in the door frame or in the door leaf and closed by way of the air gap between the door frame and the door leaf.

BRIEF SUMMARY OF THE INVENTION

It is the object of the present invention to overcome the disadvantages of the prior art at least partially and in particular to provide an energy transmission device which can be assembled in a particularly easy and robust manner and effectively transmits energy to a door of a household appliance.

This object is achieved according to the features of the independent claims. Advantageous embodiments form the subject matter of the dependent claims, the description, and the drawings.

The object is achieved by a household appliance, having a treatment chamber with a loading opening, which can be closed by means of a door which can be pivoted via door hinges, which door has at least one electrical load, and at least one energy transmission device with a primary side, which has at least one primary coil, and a secondary side, which has at least one secondary coil wherein the secondary side is arranged on the door and is electrically connected to the at least one load, and the primary coil, at least in the closed state of the door, can be coupled in the manner of a transformer to the secondary coil, and the primary side is attached to a stationary part of a respective door hinge.

The advantage is achieved that energy can be transmitted particularly effectively to the load of the door by means of a coupling in the manner of a transformer, since when the door is closed, the primary side and the secondary side can be positioned particularly close to one another. Moreover, the door hinge, as a connection element between the door and appliance, advantageously has the shortest tolerance paths to the door. Furthermore, this energy transmission device is particularly robust since it does not need to have inherently movable parts. Furthermore, the ability to remove the door also remains assured. In addition, the energy transmission device may be inconspicuous to a user and can be implemented without disadvantages in terms of cleaning and operation. A further advantage is that the primary side can be supplied firmly fastened to the stationary part of the door hinge from an assembly line and is thus assembled together with the door hinge.

The household appliance can be a cooking appliance, e.g. an oven, a microwave appliance or a combination thereof, for instance an oven with microwave function or a microwave appliance with at least one additional IR emitter such as at least one electrical resistance heating element. The treatment chamber can then also be referred to as a cooking chamber. However, the household appliance can also be a refrigeration appliance, laundry treatment appliance, dishwasher, small household appliance etc.

The door is typically pivotably connected to the rest of the household appliance or carcass by way of two door hinges.

The electrical load or consumer can comprise e.g. a display device such as a monitor, one or more LEDs etc., a control device, at least one sensor, at least one actuator, a door electronics system, a communication device etc.

By means of the energy transmission device, the at least one primary coil can be excited on the primary side by the current feed in order to generate a magnetic alternating field. At least in the closed state of the door, an induction voltage is as a result induced in the at least one secondary-side secondary coil, which can be tapped in order to supply current to at least one door-side load. This can also be referred to as inductive coupling or coupling in the manner of a transformer.

In one development, precisely one energy transmission device is provided, which is arranged on one of the door hinges. Alternatively, two energy transmission devices may be provided, which are each arranged on one of the door hinges.

In one embodiment, the primary side has at least one primary coil and at least one circuit (primary electronics) for operating the primary coil and/or the secondary side has at least one primary coil and at least one circuit (secondary electronics) for operating the secondary coil. The primary electronics can be provided to control the at least one primary coil and/or to evaluate electrical signals of the at least one primary coil. The primary electronics can comprise or be power and/or driver electronics for the at least one primary coil, for instance. The secondary electronics can be provided for operating the secondary coil, e.g. for controlling the at least one secondary coil and/or for evaluating electrical signals of the at least one secondary coil. The secondary electronics can comprise or be for instance power and/or driver electronics for the at least one secondary coil, a rectifier circuit, a smoothing circuit etc. The circuits can be embodied as electronic circuits or electronics. In one development, the primary side has one or more primary coils. In one development, the secondary side has one or more secondary coils.

In general, besides energy for operating the door load (power energy), data can also be transmitted by the energy transmission device for instance unidirectionally from the primary side to the secondary side, unidirectionally from the secondary side to the primary side or bidirectionally between the primary side and the secondary side. The data can comprise data transmitted from the primary side to the secondary side, for instance, for controlling at least one door-side load such as an actuator, a display device etc. and/or measurement data of at least one door-side sensor transmitted from the secondary side to the primary side, input data of a door-side control device etc.

In one development, the primary coil and the secondary coil, which are provided to transmit the energy for operating the door load, are also provided or used as antennas for data transmission. For data transmission, the coil to be used as a transmitter can be excited with a data-carrying excitation signal, so that an electrical signal is induced on the opposing coil, which is then used as a receive coil, from which electrical signal the data can then be read out accordingly. The data transmission can take place at the same time as the power transmission, for instance by amplitude and/or frequency modulation of the excitation signal used for power transmission. Alternatively or in addition, data and power energy could then be transmitted at different times ("time-multiplexed"). It is also possible for the power energy and the data to be transmitted over different frequencies or frequency bands ("frequency-multiplexed"). In particular, in this case (but not restricted hereto), it is advantageous if the primary side and the secondary side each have a coil for transmitting power energy and a coil for data transmission. The coils of one side can be adjusted to the frequencies and applications used, e.g. in respect of their size, number of windings etc. In general, it is advantageous if, in order to achieve a particularly short-range data transmission path, the data transmission is also carried out by means of coupling in the manner of a transformer. Alternatively, the data transmission can generally take place by way of radio (e.g. by way of Bluetooth) or by way of an optical and/or infrared data transmission path.

A unidirectional data transmission to the secondary side in the manner of a transformer can take place e.g. with a data rate of 100 Bit/s or more. With a bidirectional data transmission in the manner of a transformer, for example data rates of several Mbit/s or more can be implemented.

In one embodiment, the primary side is attached to a hinge housing. This advantageously makes possible a particularly simple assembly and close proximity to the secondary side. The primary side can be screwed, glued and/or latched (clipped) to the hinge housing, for instance. The hinge housing is typically fixedly installed in the household appliance and e.g. pivotably connected to a door strut which is fixedly connected to the door. A typically spring-supported damping mechanism for damping a door movement can be accommodated in the hinge housing.

In one embodiment, the primary side is attached as far forward as possible on the door hinge, in particular on a front-side end section of the hinge housing. The primary side can therefore be brought particularly close to the secondary side and an air gap of the transformer halves, primary coil and secondary coil, can be kept particularly small. Further advantages are that the temperature at this point is comparatively low and the unit is protected by a condensate drip tray, if present.

In one embodiment, the primary side projects laterally from the front-side end section and is connected via at least one cable running along a longitudinal side of the hinge housing to a connector plug arranged on a rear end section, in particular on a rear end face, of the hinge housing. The advantage is then achieved that the energy transmission device can be implemented in a particularly compact manner, can be fastened securely and can be easily connected. The energy transmission device can be connected to a central control device of the household appliance and/or to a power supply by way of the connector plug, for instance. The connector plug can have in particular one or more power supply connections and possibly one or more data connections, possibly also combination connections for current and data. It can be embodied as a USB connector, for instance.

In one development, the primary side projects laterally from the stationary part, in particular hinge housing, so that it extends parallel to the door when the door is closed. The primary coil can project laterally at right angles from the stationary part, in particular hinge housing.

In one embodiment, the at least one cable runs at least in sections within the hinge housing or in a cable channel arranged on the longitudinal side of the hinge housing. The course within the hinge housing is particularly space-saving, while the use of an external cable channel enables a particularly simple installation.

In one development, a primary-side part of the energy transmission device is embodied as a continuous, in particular rigid module, which comprises the primary side (primary coil(s)) and electronics), the cable channel and the connector plug. The advantage is achieved that the primary-side part can be operated in one piece and thus particularly simple assembly is enabled and moreover during assembly a position of the primary side is reached easily and precisely.

In one development, the secondary side is arranged relative to the point of rotation of the door hinge and thus of the door, so that when the door is open it sinks below the primary side. The secondary side can be stowed in a particular space-saving and secure manner when the door is open.

In one embodiment, the secondary side is fastened to a door panel of the door. This facilitates an arrangement that is particularly close to the primary side, and a particularly flat design.

In one embodiment, current-conducting parts of the secondary side are accommodated in a housing which is open to the door panel and the housing is glued to the door panel, in particular in a water-tight manner. A particularly flat design of the secondary side is therefore enabled in the depth direction or at right angles to the panel surface.

In order to achieve a flat shape, the housing can in particular have the shape of a flat, cuboid hollow body, the wide side of which is open. In order to attach and seal the housing on the door panel in a particularly reliable manner, the open edge of the wide side of the housing can be embodied to be flange-like. In order to provide a particularly flat design and reliable fastening, the housing has an omega shape cross-sectionally.

In one development, the at least one secondary coil and the secondary electronics are accommodated in the housing. In one development, the secondary electronics, in particular a mount or a printed circuit board thereof, are or have been clipped or latched, screwed or hot-stamped into the housing.

The housing can be glued to the door panel by way of the flange, e.g. by means of an adhesive tape (e.g. a foam adhesive tape) or by means of a wet adhesion process, in particular so that no water is able to penetrate the interior of the housing.

Alternatively, the housing can be a housing which is closed on all sides or fully enclosed.

In one embodiment, the primary side and the secondary side are accommodated in a respective housing. There is also provision to protect the primary side from environmental influences. In one development, the at least one primary coil and the primary electronics are accommodated in the housing of the primary side. In one development, the housing of the primary side is a fully enclosed housing. In one development, the primary electronics, in particular a mount or a printed circuit board thereof, are or have been clipped or latched, screwed or hot-stamped into the associated housing. In particular, the housing of the primary side can be embodied as a casing, e.g. plastic casing.

The accommodation of coil(s) and electronics in a shared unit, in particular in a shared housing, moreover gives rise to a particularly close arrangement of the electronics (e.g. the power and driver electronics) on an associated coil, so that particularly short cableways are achieved. As a result, an inadequate signal quality is in turn avoided.

In one embodiment, the household appliance is a microwave appliance and the housing of the primary side and/or the housing of the secondary side are shielded against microwaves. The primary side and/or the secondary side can therefore be protected particularly reliably against an influence of microwaves. The shield can be a thin shielding plate, e.g. with a thickness of approx. 0.35 to 0.5 mm. The shield can be omitted on the side of the housing facing the respective other coil when the door is closed. Alternatively or in addition, the shield is impermeable to microwaves but permeable to magnetic alternating fields and/or radio signals exchanged in the manner of a transformer between the primary side and the secondary side. In addition or alternatively, this embodiment can be shielded against external induction signals, which makes it particularly advantageous for cooking appliances with an induction function.

In one embodiment, the household appliance is designed to identify a door opening position, in particular the existence of a closed door, by means of the at least one energy transmission device. This can be reliably implemented on account of the low range of the coupling in the manner of a transformer in the range of millimeters. For instance, the existence of a closed door can be identified in that an electrical signal, in particular a power signal for operating a load, can be tapped at the secondary side. If the door is opened, the coupling in the manner of a transformer collapses. On the basis of the existence of a coupling in the manner of a transformer, it is therefore possible to establish whether the door is open or closed. In one development, the energy transmission device can replace the previously available mechanical door contact switch.

BRIEF DESCRIPTION OF THE DRAWINGS

The afore-described properties, features and advantages of this invention and the manner in which these are achieved will become clearer and more intelligible in connection with the following schematic description of an exemplary embodiment, which is explained in more detail in connection with the drawings.

DETAILED DESCRIPTION OF EXEMPLARY EMBODIMENTS OF THE PRESENT INVENTION

Figure 1:
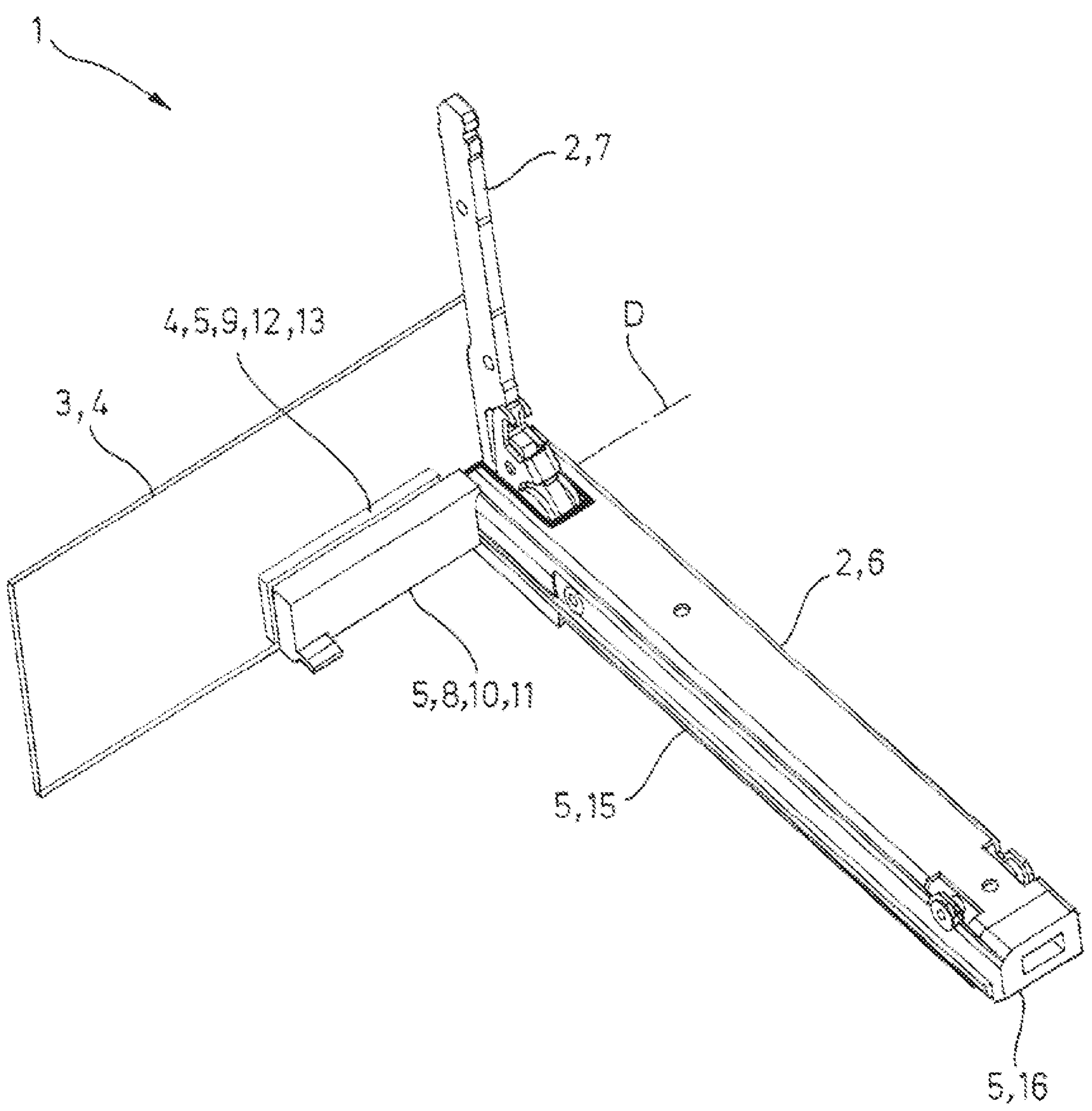
FIG. 1 shows an oblique rear view of a door hinge of an oven with a door panel attached thereto and shown in sections as well as an energy transmission device of the oven.

FIG. 1 shows an oblique rear view of a door hinge 2 of an oven 1 with a door panel 3 of an oven door 4 attached thereto and shown in sections as well as an energy transmission device 5 of the oven 1. In its closed position, the oven door 4 closes a loading opening (figure above) of a cooking chamber (figure above). This door hinge 2 is the left door hinge 2 in a front view onto the loading opening.

The door hinge 2 has a hinge housing 6 installed in a stationary manner in the oven 1, on which hinge housing a door strut 7 connected to the oven door 4 is mounted pivotably about a horizontal axis of rotation D. The oven door 4 and consequently also the door panel 3 can be pivoted with the door strut 7, e.g. between the closed position of the oven door 4 shown and a completely open position of the oven door 4. At least one electrical load (figure above) is arranged on the oven door 4. The energy transmission device 5 is provided (i.e. designed and arranged) to wirelessly supply the at least one electrical load at least with energy (current, voltage etc.) at least when the oven door 4 is closed. In one variant, data can also be transmitted in a unidirectional or bidirectional manner by way of the energy transmission device 5.

To this end, the energy transmission device 5 has a primary side 8 fastened to the hinge housing 6 and a secondary side 9 fastened to the door panel 3. The primary side 8 has a primary coil 10 and primary electronics 11 controlling and/or evaluating this, while the secondary side 9 has a secondary coil 12 and secondary electronics 13 controlling and/or evaluating this. The secondary electronics 13 are connected to the at least one door-side load for their current supply.

In the closed state of the oven door 4 shown, the primary side 8 and the secondary side 9 and thus also the primary coil 10 and the secondary coil 12 face one another separated only by a short distance from one another. The two coils 10, 12 can then be coupled in the manner of a transformer, e.g. if the primary coil 10 is excited by an alternating current, the magnetic alternating field generated thereby can induce an induction voltage in the secondary coil 12, which, possibly after processing by the secondary electronics 13, such as rectification, smoothing etc., is made available to the door-side load as an operating voltage. If the oven door 4 is opened, the coupling in the manner of a transformer or inductor can collapse with merely a small door opening angle. The energy transmission device 5 can then also be used to identify a door opening position (in particular an existence of a closed door position). The energy transmission device 5 can be used in addition or alternatively to a conventional door switch.

In order also to be able to operate the at least one electrical load at least for a certain time when the oven door 4 is open, an energy storage unit (figure above), such as a super capacitor or similar, can be present on the door side. This energy storage unit can likewise be charged by way of the energy transmission device 5.

The primary side 8 is attached to a door-side or front-side end of the hinge housing 6, namely so that it projects at right angles therefrom, specifically in a horizontal direction, in particular in the direction of the other door hinge. In the closed state of the oven door 4, the primary side 8 and the secondary side 9 are aligned parallel with one another on their broad sides.

On the longitudinal side of the hinge housing 6, from which the primary side 8 also projects, a cable channel 15 runs on the outside from the primary side 8 or the front-side end section to a rear or appliance-side end face of the hinge housing 6. A connector plug 16 is arranged on the rear end face. The connector plug 16 is connected to the primary side by way of cables (figure above), which run through the cable channel 15. Electrical signals (e.g. for supplying current and possibly transmitting data) can therefore be received by way of the connector plug 16 and routed through the cables to the primary side 8. Conversely, data or data signals can also be routed from the primary side 8 to the connector plug 16, for instance. The primary side 8, the cable channel 15 and the connector plug 16 can be present as a single-piece module which is in particular rigid or only elastically flexible with effort. This can be fastened to the door hinge 2 in particular before the door hinge 4 is assembled in the oven 1. This is advantageous in that the assembly process for assembling the door hinge 4 does not need to be changed or need only be changed marginally.

Figure 2:
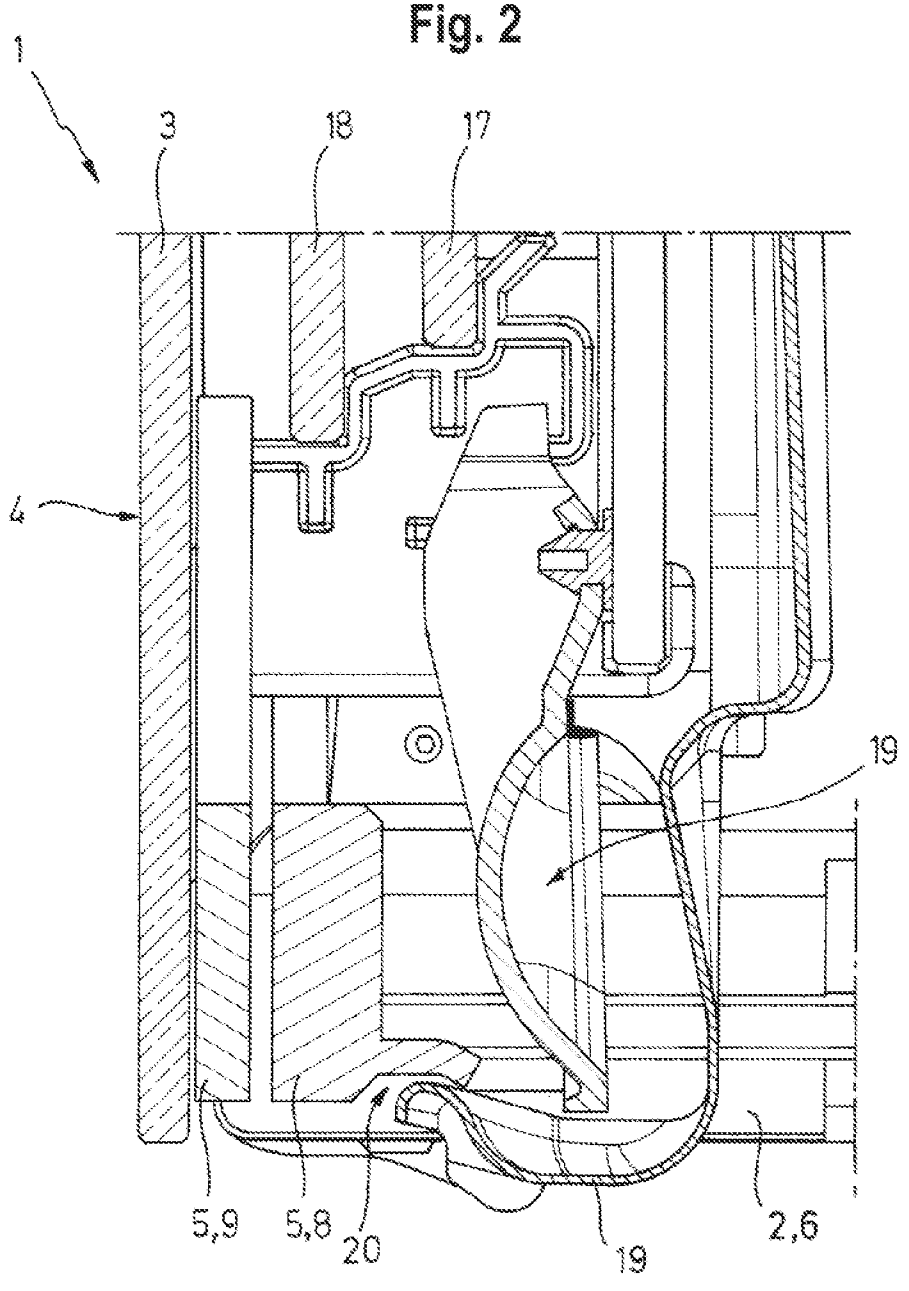
FIG. 2 shows a sectional representation in a side view of a cutout of the oven from FIG. 1 in the region of the energy transmission device when the door is closed.

FIG. 2 shows a sectional representation in a side view of a cutout of the oven 1 in the region of the energy transmission device 5 when the oven door 4 is closed. The oven door 4 not only has the door panel 3 which is used as an outer panel, but also an inner panel 17 on the cooking chamber side and an intermediate panel 18, which form a panel packet of the oven door 5.

The primary side 8 is arranged in front of a condensate drip tray 19, so that the drip tray 19 forms a protective wall for the primary side 8 vis-à-vis the cooking chamber, e.g. in order to protect against high temperatures, soiling, microwave radiation etc. The primary side 8 has a support 20, which prevents the primary side 8 from breaking or bending down in the event of mechanical stress, since the primary side 8 attaches to the drip tray with its support 20 beforehand.

Figure 3:
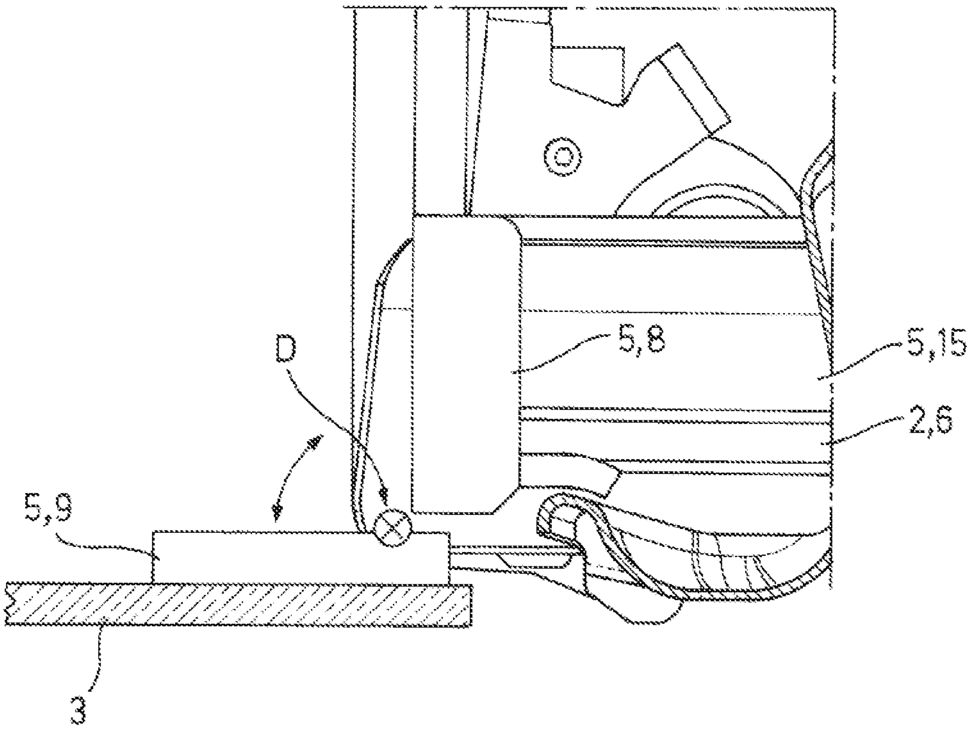
FIG. 3 shows a sectional representation in a side view of a cutout of the oven from FIG. 1 in the region of the energy transmission device when the door is open.

FIG. 3 shows a sectional representation in a side view of a cutout of the oven 1 in the region of the energy transmission device 5 when the oven door 4 is open. In this door position, the secondary side 9 is arranged relative to the axis of rotation D so that it sinks below the primary side 8 in a space-saving manner.

Figure 4:
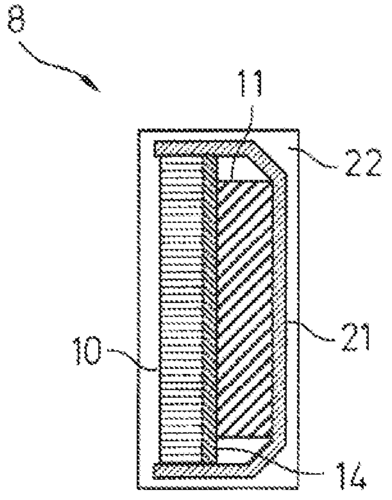
FIG. 4 shows a sectional representation in a front view of a housed primary side of the energy transmission device.
Figure 5:
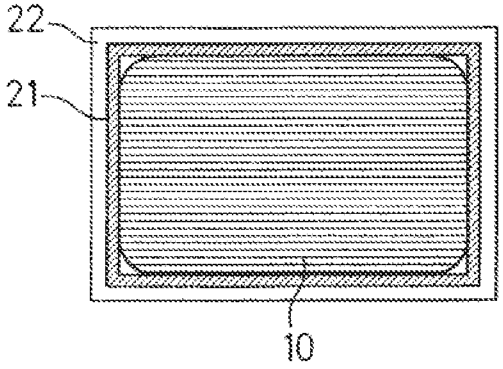
FIG. 5 shows a sectional representation in a front view of the housed primary side of the energy transmission device.

FIG. 4 shows a sectional representation in a side view of a housed primary side 8 of the energy transmission device 5. FIG. 5 shows a sectional representation of the housed primary side 8 in a front view. The primary side 8 has the primary coil 10, on which a ferrite layer 14 is arranged on its broad side facing away from the door or on the side of the appliance. The primary electronics 11 are arranged here facing away from the door or behind the ferrite layer 14. These components 10, 11, 14 can, in particular with the exception of the broad side facing away from the door, be surrounded by a shield 21, such as e.g. a metal sheet. The shield 21 protects the components 10, 11, 14 e.g. from electromagnetic radiation produced in the oven 1, such as microwave radiation and/or induction radiation e.g. of an induction hob. The oven 1 can therefore have a microwave function and/or represent part of a cooker, which has a hob, in particular an induction hob, in addition to the oven 1. The components 10, 11, 14, 21 can be surrounded on all sides by a casing 22, e.g. a plastic case, in order to further protect against environmental influences. The casing 22 can also be considered to be a housing of the primary side 8.

Figure 6:
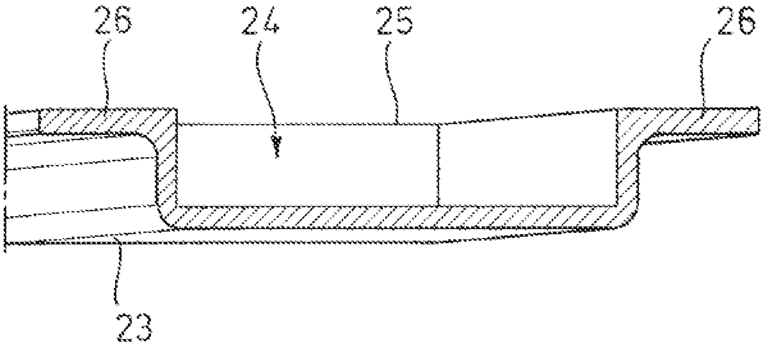
FIG. 6 shows a sectional representation in an oblique view of a housing of a secondary side of the energy transmission device.

FIG. 6 shows a sectional representation in an oblique view of a housing 23 of the secondary side 9 of the energy transmission device 5. The housing 23 may have been produced separately. The housing 23 consists of dielectric or electrically non-conducting material such as plastic. The housing 23 has a cavity 24 in the form of a flat cuboid, wherein a door-side broad side 25 of the cavity 24 is open. The free edge of the broad side 25 is embodied as a planar support or flange 26. The housing 23 can be glued to the door panel 3 by way of the flange 26. The secondary coil 12, the secondary electronics 13, possibly a ferrite layer etc. can be accommodated in the cavity 24. In particular, the cavity 24 can be fastened to the door panel 3 in a water-tight manner. The housing 23 can additionally have one or more apertures (figure above), through which cables (figure above) can run to the at least one door-side load.

The invention is naturally not restricted to the exemplary embodiment shown.

In general, "a" or "an" can be understood to mean a single or a multiple, in particular in the sense of "at least one" or "one or more" etc., unless this is explicitly excluded, e.g. by the expression "precisely one" etc.

A number can also comprise precisely the number specified and also a typical tolerance range, unless this is explicitly excluded.

The invention claimed is:

1. A household appliance, comprising:

a door pivotable via door hinges and having an electrical load;

a treatment chamber having a loading opening which is closeable by the door; and an energy transmission device having a primary side including a primary coil which is attached to a stationary part of a respective one of the door hinges, and a secondary side including a secondary coil which is arranged on the door and is electrically connected to the electrical load, wherein the primary coil is capable of being coupled in a manner of a transformer to the secondary coil when the door is closed, the secondary side is fastened to a door panel of the door, and the secondary side has current-carrying parts which are accommodated in a housing which is open to the door panel, said housing being glued to the door panel in a water-tight manner.

2. The household appliance of claim 1, constructed in the form of a microwave appliance, wherein the primary side and the secondary side are accommodated in housings, respectively, with at least one of the housings including a shield against microwaves radiating from the microwave appliance.

3. The household appliance of claim 1, wherein the primary side includes a circuit for operating the primary coil and/or the secondary side includes a circuit for operating the secondary coil.

4. The household appliance of claim 1, wherein the primary side is attached to a hinge housing of the respective one of the door hinges.

5. The household appliance of claim 4, wherein the primary side is attached to a front-side end section of the hinge housing.

6. The household appliance of claim 5, wherein the primary side projects laterally from the front-side end section and is connected via a cable running on a longitudinal side of the hinge housing with a connector plug arranged on a rear end section of the hinge housing.

7. The household appliance of claim 6, wherein the connector plug is arranged on a front face of the rear end section of the hinge housing.

8. The household appliance of claim 6, wherein the cable runs at least in a section within the hinge housing or in a cable channel arranged on the longitudinal side of the hinge housing.

9. A household appliance, comprising:

a door pivotable via door hinges and having an electrical load;

a treatment chamber having a loading opening which is closeable by the door; and an energy transmission device having a primary side including a primary coil which is attached to a stationary part of a respective one of the door hinges, and a secondary side including a secondary coil which is arranged on the door and is electrically connected to the electrical load, wherein the primary coil is capable of being coupled in a manner of a transformer to the secondary coil when the door is closed, and the energy transmission device is configured to identify a door opening position of the door.

10. A household appliance, comprising:

a door pivotable via door hinges and having an electrical load;

a treatment chamber having a loading opening which is closeable by the door; and an energy transmission device having a primary side including a primary coil which is attached to a stationary part of a respective one of the door hinges, and a secondary side including a secondary coil which is arranged on the door and is electrically connected to the electrical load, wherein the primary coil is capable of being coupled in a manner of a transformer to the secondary coil when the door is closed, and the primary side and the secondary side are coupled to one another for wireless data transmission.

* * * * *